US010421466B2

(12) United States Patent
Diemling et al.

(10) Patent No.: US 10,421,466 B2
(45) Date of Patent: Sep. 24, 2019

(54) SPRING CUP FOR A PRIMARY SUSPENSION OF A RAIL VEHICLE

(71) Applicant: Siemens AG Oesterreich, Vienna (AT)

(72) Inventors: Anton Diemling, Lannach (AT); Radovan Seifried, Maribor (SI)

(73) Assignee: Siemens Mobility GMBH, Vienna (AT)

( * ) Notice: Subject to any disclaimer, the term of this patent is extended or adjusted under 35 U.S.C. 154(b) by 180 days.

(21) Appl. No.: 15/531,359

(22) PCT Filed: Oct. 13, 2015

(86) PCT No.: PCT/EP2015/073660
§ 371 (c)(1),
(2) Date: May 26, 2017

(87) PCT Pub. No.: WO2016/083010
PCT Pub. Date: Jun. 2, 2016

(65) Prior Publication Data
US 2017/0334467 A1 Nov. 23, 2017

(30) Foreign Application Priority Data
Nov. 27, 2014 (AT) ................................ A 50859/2014

(51) Int. Cl.
*B61F 5/30* (2006.01)
*B60G 11/54* (2006.01)
(Continued)

(52) U.S. Cl.
CPC .............. *B61F 5/302* (2013.01); *B60G 11/54* (2013.01); *B60G 17/021* (2013.01); *B61F 5/301* (2013.01);
(Continued)

(58) Field of Classification Search
CPC . B61F 5/30; B61F 5/301; B61F 5/302; B60G 11/54
(Continued)

(56) References Cited

U.S. PATENT DOCUMENTS 3,417,986 A * 12/1968 Fuke ...................... B60G 11/54
267/33
5,001,989 A * 3/1991 Mulcahy ................. B61F 5/325
105/199.5
(Continued)

FOREIGN PATENT DOCUMENTS

CH 175 221 A 2/1935
CN 201856779 U 6/2011
(Continued)

*Primary Examiner* — Jason C Smith
(74) *Attorney, Agent, or Firm* — Cozen O'Connor

(57) ABSTRACT

A spring cup for a primary suspension of a rail vehicle, wherein the spring cup has a longitudinal axis and a spring base for transmitting occurring forces onto a chassis frame of the rail vehicle, and includes a spring seat for receiving at least one spring element, wherein the spring seat is supported against the spring base of the spring cup, where a central section of the spring seat is formed as a contact element having a contact surface for an emergency spring device, and the spring seat is configured such that a force acting on the contact surface is introduced into the spring base outside of the projection surface, resulting from the projection at least of the contact surface along the longitudinal axis onto the spring base in order to achieve a transfer of force from the center of the spring base.

19 Claims, 3 Drawing Sheets

(51) Int. Cl.
  *B60G 17/02* (2006.01)
  *B61F 5/34* (2006.01)
  *B61F 5/08* (2006.01)
  *B61F 5/14* (2006.01)
(52) U.S. Cl.
  CPC ...... *B61F 5/34* (2013.01); *B60G 2204/12422* (2013.01); *B61F 5/08* (2013.01); *B61F 5/148* (2013.01)
(58) Field of Classification Search
  USPC .................. 105/199.5, 198.1, 198, 198.7
  See application file for complete search history.

(56) References Cited

U.S. PATENT DOCUMENTS

| | | | | |
|---|---|---|---|---|
| 5,086,707 | A * | 2/1992 | Spencer | B60G 99/006 |
| | | | | 105/199.3 |
| 7,121,212 | B2 * | 10/2006 | Schorr | B61F 5/14 |
| | | | | 105/199.3 |
| 8,534,202 | B2 * | 9/2013 | McKisic | B61F 15/20 |
| | | | | 105/199.3 |
| 2002/0109328 | A1 * | 8/2002 | Remmert | B60G 11/16 |
| | | | | 280/124.147 |
| 2007/0017761 | A1 * | 1/2007 | Huprikar | B60G 7/04 |
| | | | | 188/321.11 |
| 2010/0162919 | A1 * | 7/2010 | Aitken | B61F 5/301 |
| | | | | 105/198.2 |
| 2016/0368342 | A1 * | 12/2016 | Nolte | B60G 11/54 |
| 2017/0334467 | A1 * | 11/2017 | Diemling | B61F 5/301 |

FOREIGN PATENT DOCUMENTS

| | | |
|---|---|---|
| DE | 1 151 827 B | 7/1963 |
| DE | 28 22 183 A1 | 10/1979 |
| DE | 9 307 004 U1 | 7/1993 |
| EP | 0 624 505 A1 | 11/1994 |
| EP | 2 000 383 A2 | 12/2008 |
| EP | 2 353 895 A1 | 8/2011 |
| EP | 2 783 939 A1 | 10/2014 |
| WO | WO 2004/043760 A1 | 5/2004 |

* cited by examiner

SPRING CUP FOR A PRIMARY SUSPENSION OF A RAIL VEHICLE

CROSS-REFERENCE TO RELATED APPLICATIONS

This is a U.S. national stage of application No. PCT/EP2015/073660 filed 13 Oct. 2015. Priority is claimed on Austrian Application No. A50859/2014 filed 27 Nov. 2014, the content of which is incorporated herein by reference in its entirety.

BACKGROUND OF THE INVENTION

1. Field of the Invention

The invention relates to a spring cup for a primary suspension of a rail vehicle, where the spring cup has a longitudinal axis and a spring base for transmitting occurring forces onto a chassis frame of the rail vehicle, and comprises a spring seat for receiving at least one spring element, where the spring seat is supported against the spring base of the spring cup.

2. Description of the Related Art

In the field of rail vehicles, bogies are normally used as running gear, where two wheelsets are usually mounted in a bogie. A wheelset comprising, in each case two wheels and a wheel axle connecting these, is attached via a primary suspension to a chassis frame of the bogie in a sprung manner. This primary suspension can have spring elements in the form of coil springs or rubber springs. Spring cups in which the primary springs are accommodated and via which the transfer of force into the chassis frame takes place are typically provided on the chassis frame. Here, such spring cups have a spring base via which the transfer of force takes place and which is generally connected to or formed by an upper flange of the chassis frame. In order to guide the spring elements and protect them from dirt accumulation, the spring cup is delimited laterally by a sheath. The spring cup is open downwards, i.e., in the direction of the primary springs.

In order to accommodate the normally metallic spring elements and center them in the spring cup, and to preserve the spring base, provision is often made for a spring seat that lies flush on the spring base and has a receiving surface for the spring elements.

In addition to the spring elements, provision is usually made in the center of the primary springs for an emergency spring device that is made of synthetic material or metal, for example, and which comes into operation as soon as the spring travel of the spring elements is exhausted. Here, the emergency spring device comes into contact with a contact element which is arranged in the center of the spring cup, where the contact element is fixed to the spring base by a receptacle and consists synthetic material or metal, for example. This situation occurs either if the spring elements fail or if the wagon parts are very heavy.

If the spring travel of the spring elements is exhausted, the spring elements are short-circuited by the contact between the emergency spring device and contact element, such that a large part of the force to be transmitted is transferred via the contact element into the center of the spring base and also therefore into the center of a longitudinal support that forms the chassis frame.

The spring cup is formed so as to be open in a downward direction and a highly localized bend load therefore occurs in the center of the spring base, thereby increasing the danger of plastic distortion in this region. Owing to the limited local rigidity, the only known solutions for overcoming these disadvantages consist in forming the spring cup as a cast part or reinforcing the spring base. Both solutions are disadvantageous, however, because the manufacturing and attachment of the spring cup as a cast part is structurally resource-intensive and involves significant additional expenditure, and the reinforcement of the spring base results in an increase in the weight of the chassis frame and the manufacturing time.

SUMMARY OF THE INVENTION

In view of the foregoing, it is therefore an object of the invention to provide a spring cup of a primary suspension, where the spring cup improves the transfer of force into the spring base in order to reduce the bending load in a manner that overcomes the disadvantages of the prior art.

This and other objects and advantages are achieved in accordance with the invention by a spring cup for a primary suspension of a rail vehicle, where the spring cup has a longitudinal axis and a spring base for transmitting occurring forces onto a chassis frame of the rail vehicle, where the spring cup comprises a spring seat for receiving at least one spring element, and where the spring seat is supported against the spring base of the spring cup.

The objects of the invention are achieved by virtue of a central section of the spring seat being formed as a contact element having a contact surface for an emergency spring device, and by virtue of the spring seat being configured such that a force acting on the contact surface is transferred into the spring base outside of a projection surface that results from the projection of at least the contact surface along the longitudinal axis onto the spring base.

As a result of forming the spring seat as a contact element, i.e., combining the spring seat with contact element, the flow of force from the contact surface into the spring base can be influenced by the layout of the spring seat. The spring seat is configured such that the transfer of force into the spring base occurs outside of the projection surface. As a result, the force is redirected out of the central region of the spring base into an outer radial region relative to the longitudinal axis. The bending load in the spring base is considerably reduced thus. In this case, the central section of the spring seat in the spring cup is generally aligned symmetrically relative to the longitudinal axis and comprises that region of the spring seat that extends essentially along the longitudinal axis.

The definition that the projection surface results from the projection of at least the contact surface along the longitudinal axis onto the spring base is intended to be understood as follows: the contact element has a surface (e.g., a flat surface) upon which the emergency spring device can act when it is in the operating state. This surface of the contact element could have a diameter (radially relative to the longitudinal axis of the spring cup) which is greater than the diameter of a component of the emergency spring device that comes into contact with the contact element. The contact surface (i.e., where contact with the emergency spring device actually occurs) would then be smaller than a surface of the contact element that faces the emergency spring device. In order to effect an outward distribution of the force transferred by the emergency spring device into the spring seat, the force should be transferred into the spring base at least radially outside of the projection of the actual contact surface. An even better force distribution into the base is produced if the transfer of force also takes place radially outside of the projection of the contact element. In this case, the spring seat would therefore be configured such that a force acting on the contact surface is transferred into the spring base outside of the projection surface that results from the projection of the contact element along the longitudinal axis onto the spring base.

In an embodiment of a spring cup in accordance with the invention, the spring seat includes a supporting surface that is in contact with the spring base outside of the projection surface (of the contact surface or of the contact element) and transfers the force into the spring base. Here, the supporting surface serves as a defined region of the transmission of force between the spring seat and spring base. As a result of the geometric shape of the supporting surface and its positioning relative to the longitudinal axis, it is advantageously possible to influence the flow of force.

In a further embodiment of the invention, the spring seat in the region of the projection surface is separated from the spring base in the direction of the longitudinal axis in order to ensure that the force is transferred into the spring base outside of the projection surface. In this simple way, the force acting on the contact surface is prevented from being transferred into the center of the spring base. Equally, this is also possible if the central section of the spring seat is separated from the spring base.

A particularly advantageous geometric shape of the supporting surface and therefore a uniform transfer of force into the spring base are established in a further embodiment of a spring cup in accordance with the invention if the supporting surface is annular.

Trials have shown that the surface pressure between the supporting surface and spring base resulting from the transfer of force does not in the case of an annular supporting surface exceed a maximum value, at which the yield point is locally exceeded, if the wall thickness of the annular supporting surface in a preferred embodiment of the invention lies in a range between 10% and 30%, preferably between 15% and 25%, of the radius of the spring seat. In this case, the radius of the spring seat extends from the longitudinal axis to the radially outermost point of the spring seat. The wall thickness is understood to be the distance between the outer and inner diameter of the annulus in a radial direction relative to the longitudinal axis.

As a result of transferring the force into a region of the spring base which, relative to the longitudinal axis, is some considerable distance from the longitudinal axis itself, the bending stress of the spring base is reduced further. In a further embodiment of a spring cup in accordance with the invention, the supporting surface is radially separated from the projection surface relative to the longitudinal axis. The greater the distance between the innermost point of the supporting surface in a radial direction and the longitudinal axis, the more the bending stress is reduced. The theoretical optimal case, in which the transfer of force occurs along a line at the radially outermost point of the spring seat and hence of the spring base, cannot however be realized due to the maximum permitted surface pressure and the material properties of the spring seat, and can therefore only be approximated via design measures.

In accordance with a further preferred embodiment of the invention, on that side which is opposite to the spring base, the spring seat has a receiving surface for at least one spring element of the primary suspension, and the receiving surface radially and at least sectionally overlaps the supporting surface (more precisely a projection of the supporting surface in the direction of the longitudinal axis). A defined bearing surface for the spring element is thus produced, where two or more receiving surfaces can also be provided if the primary suspension comprises two or more spring elements. As a result of overlapping the projection of the supporting surface and the receiving surface, the force transferred from the spring elements onto the spring seat can be transferred directly into the spring base.

In a further embodiment of a spring cup in accordance with the invention, the supporting surface includes at least the radially outermost region of the spring seat relative to the longitudinal axis. Here, the spring seat preferably extends in a radial direction as far as a sheath of the spring cup itself. The transfer of force in the radially outermost region of the spring base has a particularly favorable effect on the bending stress of the spring base. Consequently, the extension of the supporting surface into this region is particularly advantageous.

A particularly favorable flow of the force that is transferred through the spring elements into the receiving surface of the spring seat is established in a further preferred embodiment if the supporting surface corresponds to the projection of the receiving surface in the direction of the longitudinal axis.

In order to combine the effects of the favorable force flow of the force that is exerted by the spring elements, particularly if more than one spring element is provided, and the force redirection of the force acting on the contact surface, a particularly preferred embodiment of a spring cup in accordance with the invention provides for the supporting surface to correspond to the projection of a section of the receiving surface that is intended to receive the spring element that is radially outermost relative to the longitudinal axis.

If the spring seat with the exception of the supporting surface is separated from the spring base in the direction of the longitudinal axis, then it is ensured in a simple manner that the transfer of force into the spring base occurs solely via the supporting surface in a further embodiment variant of the invention.

It is also an object of the invention to provide a primary suspension of a rail vehicle for the sprung attachment of a wheelset bearing of the rail vehicle to a chassis frame of the rail vehicle, comprising at least one spring element, an emergency spring device, and a spring cup as per the invention, where the at least one spring element is accommodated in the spring seat and the emergency spring device can come into contact with the contact surface. Here, the spring base of the spring cup is either connected to the chassis frame or formed by the chassis frame, e.g., as a section of the upper flange of a longitudinal support of the chassis frame. The integration of the spring cup into the primary suspension represents the installed state in a rail vehicle that is ready for operation. Here, the force acting on the contact surface is inventively transferred into an outer radial region relative to the longitudinal axis, whereby the bending load is reduced.

In accordance with an embodiment, the supporting surface corresponds at least to the projection of a spring element in the direction of the longitudinal axis. It is thereby again ensured that the transfer of the force occurs in a favorable region and that the force exerted by the at least one spring element can be transferred directly into the spring base.

In accordance with a further embodiment of a primary suspension having a spring cup as per the invention, the at least one spring element is formed as a first and a further coil spring which are arranged concentrically relative to the longitudinal axis, and the supporting surface corresponds to the projection of the first coil spring, the supporting surface being radially outermost relative to the longitudinal axis. The combination of the positive effects derived from direct transfer of the force exerted by the springs and the redirection of the force acting on the contact surface is therefore also achieved if more than one spring element is present.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTIONS OF THE DRAWINGS

In order to further explain the invention, reference is made in the following part of the description to the figures, from which further advantageous embodiments, details and developments of the invention can be derived. The figures are provided as examples and are intended to illustrate the character of the invention, but do not in any way restrict or even conclusively depict the character of the invention, in which.

DETAILED DESCRIPTION OF THE EXEMPLARY EMBODIMENTS

Figure 1:
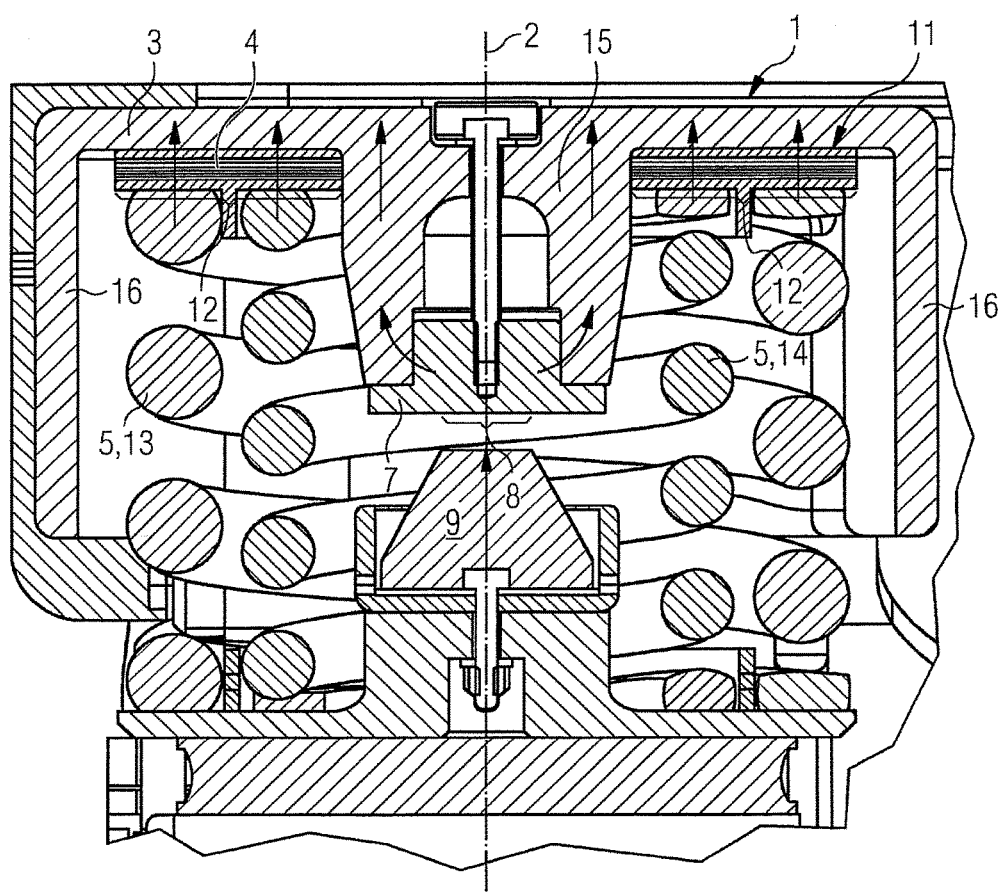
FIG. 1 shows a sectional view of a primary suspension comprising a spring cup in accordance with the prior art.

FIG. 1 shows an embodiment of a spring cup 1 in accordance with the prior art in a primary suspension for a rail vehicle. The spring cup 1 is usually arranged on a chassis frame of a bogie of the rail vehicle and has a longitudinal axis 2. The spring cup 1 is formed of a spring base 3, which is used to transfer occurring forces into the chassis frame, and a sheath 16. The spring cup 1 is also used in this case to guide the primary suspension, which in this embodiment is formed as two spring elements 5, more precisely a first coil spring 13 and a further coil spring 14.

In order to allow the coil springs 13,14 to be accommodated, a disc-shaped spring seat 4 is arranged in the spring cup 1, which is in contact with the spring base 3, on one side, and forms a receiving surface 12 for the coil springs 13,14 on the other side.

At its center, the spring cup 1 has a receptacle 15 for a contact element 7 with which an emergency spring device 9 can come into contact via a contact surface 8. The spring seat 4 is supported against a flat surface of the spring base 3 and lies flush thereon with the exception of the central region in which the receptacle 15 is arranged.

If the spring travel of the coil springs 13,14 is not yet exhausted, the occurring spring forces are transferred directly via the spring seat 4 into the spring base 3, as indicated by the arrows at the spring seat 4. Radially relative to the longitudinal axis 2, the closer to the longitudinal axis 2 the force is transferred, the higher the bending load in the spring base 3.

However, as soon as the spring travel of the coil springs 13,14 is exhausted, the emergency spring device 9 comes into contact with the contact surface 8 of the contact element 7, such that a large part of the forces is transferred directly into the center of the spring base 3 via the contact element 7 and the receptacle 15, as indicated by the arrows in the receptacle 15. This ensures that both the load on the coil springs 13,14 is reduced in order to avoid any plastic distortion, and an emergency suspension is provided if at least one of the coil springs 13,14 fails. However, as a result of the central transfer of force, a particularly high bending load acts on the spring base 3, and could result in local distortions.

In the present exemplary embodiment, deformation due to the high bending load occurs as a result of designing the spring cup 1 as a cast part. A cast spring cup 1 is, however, cost-intensive in terms of manufacturing and must be attached to the chassis frame during the assembly, where the chassis frame is usually formed as a weldment. This is both resource-intensive in terms of structure, and involves considerable manufacturing time and greater weight.

Figure 2:
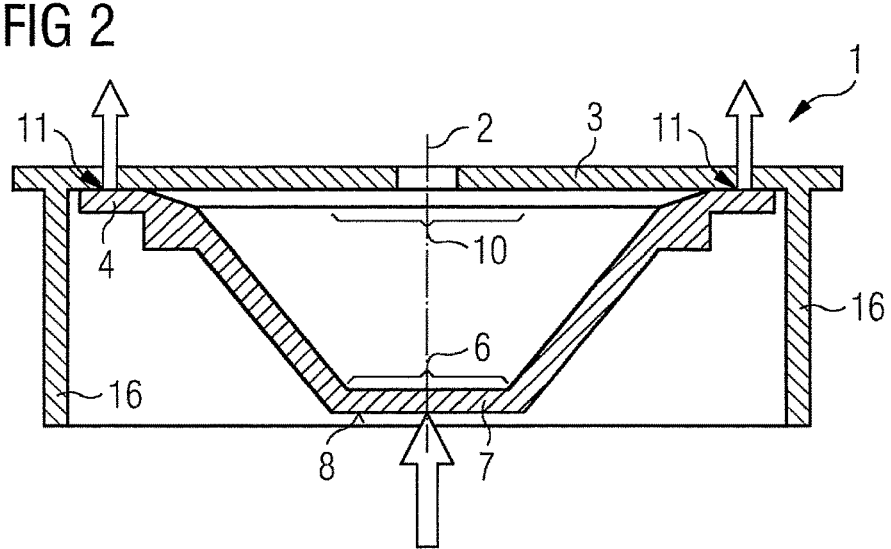
FIG. 2 shows a schematic representation of a spring cup with force acting via the contact surface in accordance with the invention.
Figure 3:
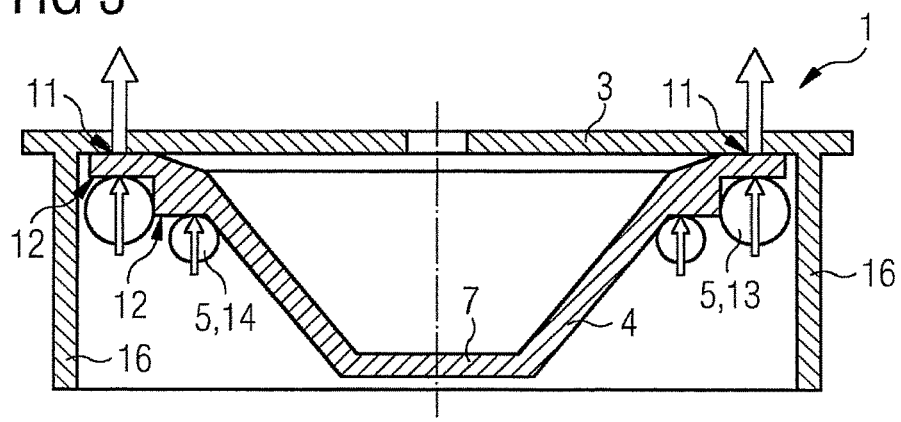
FIG. 3 shows a schematic representation of a spring cup with force acting via the spring elements in accordance with the invention.
Figure 4:
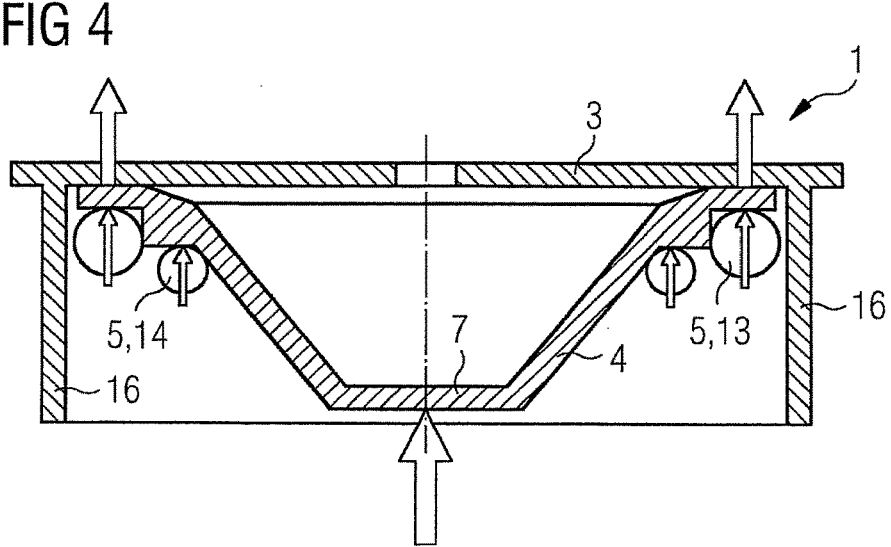
FIG. 4 shows a schematic representation of a spring cup with force acting in a combined manner in accordance with the invention.

FIGS. 2 to 4 show a schematic representation in the form of a longitudinal section through the same inventive spring cup 1. The figures differ in each case with respect to the location of the transfer of force. The spring cup 1 has a longitudinal axis 2 and is formed by a spring base 3 and a sheath 16, where the sheath 16 extends essentially parallel to the longitudinal axis 2. The cross section of the spring cup 1, i.e., perpendicular relative to the longitudinal axis 2, is essentially circular in this case but other geometric shapes are also feasible, such as rectangles with rounded corners or ellipses to name but a few.

In this case, the spring seat 4 forms the contact element 7, in the shape of a circular disc here, and is configured so that a force acting on the contact surface 8 of the contact element 7 is transferred into the spring base 3 outside of a projection surface 10 of the contact element 7. Here, the projection surface 10 corresponds to a surface that results from the projection of at least the contact surface 8 along the longitudinal axis 2 onto the spring cup 1 or onto the spring base 3 of the spring cup 1. It is thereby ensured that the force acting on the contact surface 8 is not transferred to the center of the spring base 3, which corresponds to the projection surface 10, but into an outer radial region. This outer radial region is therefore radially separated from the projection surface 10 relative to the longitudinal axis 2.

In structural terms, this is achieved in the present exemplary embodiment in that the spring seat 4 forms the contact element 7 in a central section 6 and in the cross section through the longitudinal axis 2, as illustrated, has an essentially hollow shape in the form of a truncated cone. Therefore the force acting on the contact surface 8, as illustrated symbolically by an arrow, and is redirected into the outer radial region where it is transferred into the spring base 3 via an annular supporting surface 11 of the spring seat 4, where the said annular supporting surface 11 is in contact with the spring base 3. As a result of the hollow shape, the spring seat 4 is separated from the spring base 3 in the region of the projection surface 10 or in the central section 6 of the spring seat 4. Here, the separation is that which can be measured in the direction of the longitudinal axis 2.

FIG. 3 shows spring cup 1 and spring seat 4 in a similar manner to FIG. 2, but two spring elements 5 of the primary springs are outlined, which are each arranged on a receiving surface 12 of the spring seat 4. Here, the receiving surface 12 is positioned on a side of the spring seat 4 that is opposite to the supporting surface 11. In a direction parallel to the longitudinal axis 2, the distance between spring base 3 and the receiving surface 12 for the radially outermost spring element 5 is smaller than the distance to the receiving surface 12 for the spring element 5 which lies further inwards radially. The occurring forces originate solely from the spring elements 5 and no force is transferred via the contact surface 8.

Here, the supporting surface 11 corresponds to the projection of the receiving surface 12 for the radially outermost spring element 5, where it is also feasible for the supporting surface 11 to correspond to the projection of the entire receiving surface 12, i.e., for all spring elements 5.

FIG. 4 illustrates the combined transfer of force via both the spring elements 5 and the contact surface 8.

The receiving surface 12 for both spring elements 5 is arranged so as to overlap the supporting surface 11 or the projection of the supporting surface 11 in the direction of the longitudinal axis 2, i.e., the projection of the supporting surface 11 on the opposite side of the spring seat 4.

Figure 5:
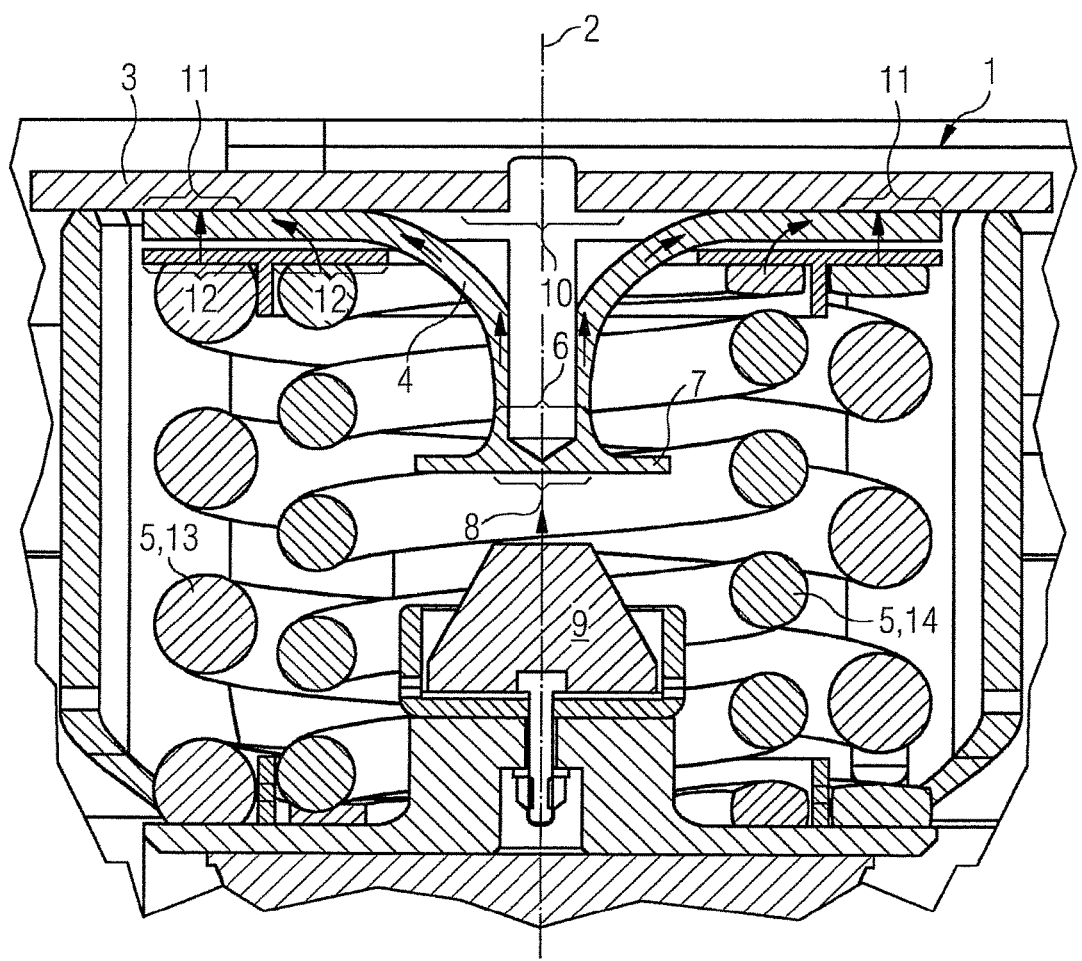
FIG. 5 shows a sectional view of a primary suspension comprising an embodiment of a spring cup in accordance with the invention.

FIG. 5 shows a primary suspension of the rail vehicle comprising an embodiment of the spring cup 1. Here, the spring base 3 and the sheath 16 are formed as a weldment, such that the spring base 3 can be formed as part of the chassis frame, in particular as an upper flange of a longitudinal support of the chassis frame. The spring elements 5 of the primary suspension accommodated in the receiving surface 12 of the spring seat 4 is formed as a first coil spring 13 that lies further outwards radially, and a further coil spring 14 that lies further inwards radially.

The spring seat 4 arranged in the spring cup 1 is inventively configured such that the force acting on the contact surface 8 is transferred into the spring base 3 outside of the projection surface 10. For this purpose, the shape of the spring seat 4 excluding the contact element 7 corresponds essentially to a funnel that extends from a flat perimeter in the region of the annular supporting surface 11, where the spring seat 4 extends parallel to the spring base 3, to the central section 6. In the region of the contact element 7, the diameter again increases in order to increase the size of the contact surface 8, thereby producing a plunger-shaped top. In comparison with the embodiment shown in FIGS. 2 to 4, additional material is thereby saved and the weight is therefore reduced.

The spring seat 4 is only in contact with the spring base 3 in the region of the supporting surface 11 and is otherwise separated from the spring base 3 relative to the longitudinal axis 2. Here, the supporting surface 11 also includes the radially outermost region of the spring seat 4, which extends as far as the sheath 16. A certain gap must naturally be maintained between spring seat 4 and sheath 16, however, in order to allow the assembly and to prevent any jamming. The supporting surface 11 also corresponds in this case to the projection of the spring elements 5, specifically the projection of the first coil spring 13.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those element steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A spring cup for a primary suspension of a rail vehicle, the spring cup having a longitudinal axis and a spring base for transmitting occurring forces onto a chassis frame of the rail vehicle, the spring cup comprising:
    a spring seat for receiving at least one spring element, said spring seat being supported against the spring base of the spring cup;
    wherein a central section of the spring seat is formed as a contact element having a contact surface for an emergency spring device; and
    wherein the spring seat is configured such that a force acting on the contact surface is transferred into the spring base outside of a projection surface which results from a projection of at least the contact surface along the longitudinal axis onto the spring base.

2. The spring cup as claimed in claim 1, wherein the spring seat includes a supporting surface which is in contact with the spring base outside of the projection surface and transfers the force acting on the contact surface into the spring base.

3. The spring cup as claimed in claim 2, wherein the spring seat in a region of the projection surface is separated from the spring base in a direction of the longitudinal axis.

4. The spring cup as claimed in claim 2, wherein the supporting surface is annular.

5. The spring cup as claimed in claim 3, wherein the supporting surface is annular.

6. The spring cup as claimed in claim 4, wherein a wall thickness of the annular supporting surface lies in a range between 10% and 30% of a radius of the spring seat.

7. The spring cup as claimed in claim 6, wherein the wall thickness of the annular supporting surface lies in a range between 15% and 25% of the radius of the spring seat.

8. The spring cup as claimed in claim 2, wherein the supporting surface is radially separated from the projection surface relative to the longitudinal axis.

9. The spring cup as claimed in claim 2, wherein the spring seat includes a receiving surface for at least one spring element of the primary suspension on a side opposite to the spring base; and wherein the receiving surface radially and at least sectionally overlaps the supporting surface.

10. The spring cup as claimed in claim 9, wherein the supporting surface includes at least a radially outermost region of the spring seat relative to the longitudinal axis.

11. The spring cup as claimed in claim 9, wherein the supporting surface corresponds to a projection of the receiving surface in the direction of the longitudinal axis.

12. The spring cup as claimed in claim 10, wherein the supporting surface corresponds to a projection of the receiving surface in the direction of the longitudinal axis.

13. The spring cup as claimed in claim 9, wherein the supporting surface corresponds to a projection of a section of the receiving surface which is intended to receive the spring element that is radially outermost relative to the longitudinal axis.

14. The spring cup as claimed in claim 10, wherein the supporting surface corresponds to a projection of a section of the receiving surface which is intended to receive the spring element that is radially outermost relative to the longitudinal axis.

15. The spring cup as claimed in claim 2, wherein the spring seat with an exception of the supporting surface is separated from the spring base in a direction of the longitudinal axis.

16. A primary suspension of a rail vehicle for a sprung attachment of a wheelset bearing of the rail vehicle to a chassis frame of the rail vehicle, comprising:
   at least one spring element;
   an emergency spring device; and
   a spring cup having a longitudinal axis and a spring base for transmitting occurring forces onto a chassis frame of the rail vehicle, the spring cup comprising:
      a spring seat for receiving at least one spring element, said spring seat being supported against the spring base of the spring cup, a central section of the spring seat being formed as a contact element having a contact surface for an emergency spring device, and the spring seat being configured such that a force acting on the contact surface is transferred into the spring base outside of a projection surface which results from a projection of at least the contact surface along the longitudinal axis onto the spring base;
   wherein the at least one spring element is accommodated in the spring seat and the emergency spring device and can contact the contact surface.

17. The primary suspension as claimed in claim 16, wherein the supporting surface corresponds at least to a projection of a spring element in a direction of the longitudinal axis.

18. The primary suspension as claimed in claim 16, wherein the at least one spring element is formed as a first coil spring and a further coil spring which are arranged concentrically relative to the longitudinal axis, and wherein the supporting surface corresponds to a projection of the first coil spring, said supporting surface being radially outermost relative to the longitudinal axis.

19. The primary suspension as claimed in claim 17, wherein the at least one spring element is formed as a first coil spring and a further coil spring which are arranged concentrically relative to the longitudinal axis, and wherein the supporting surface corresponds to a projection of the first coil spring, said supporting surface being radially outermost relative to the longitudinal axis.

* * * * *